(12) United States Patent
Wang

(10) Patent No.: US 6,280,577 B1
(45) Date of Patent: Aug. 28, 2001

(54) DISTILLER

(76) Inventor: Long-Ming Wang, No. 36, Lane 955, Chiu-Ju 4th Road, San-Min District, Kaohsiung (TW)

(*) Notice: Subject to any disclaimer, the term of this patent is extended or adjusted under 35 U.S.C. 154(b) by 0 days.

(21) Appl. No.: 09/263,496

(22) Filed: Mar. 8, 1999

(51) Int. Cl.⁷ ...................................................... B01D 3/00
(52) U.S. Cl. ...................... 202/185.3; 165/163; 202/189; 202/190; 203/10; 203/100
(58) Field of Search .............. 202/185.3, 185.4, 202/185.5, 185.6, 82, 189, 190; 203/10, 100; 165/110, 150, 163, 184, 302; 55/385.4

(56) References Cited

U.S. PATENT DOCUMENTS

| | | | |
|---|---|---|---|
| 4,342,623 | 8/1982 | Loeffler | 202/83 |
| 4,546,819 | * 10/1985 | O'Connor | 165/70 |
| 4,691,766 | * 9/1987 | Wurz | 165/135 |
| 4,818,344 | 4/1989 | Glucksman | 202/176 |
| 5,110,419 | * 5/1992 | Weber et al. | 202/185.3 |
| 5,662,779 | * 9/1997 | Greene et al. | 202/185.5 |
| 5,951,825 | * 9/1999 | Land | 202/185.6 |

\* cited by examiner

Primary Examiner—Virginia Manoharan
(74) Attorney, Agent, or Firm—Bacon & Thomas PLLC

(57) ABSTRACT

A liquid distiller. The distiller includes a main body having a main housing inside which water is heated to generate steam. The steam is passed through a condenser. A fan is positioned inside the distiller to supply cool air to the condenser. A water output is defined in the main body. Air inlets are defined in a outer periphery of the main housing. An upper lid is mounted on top of the main body and includes an air outlet in an upper side thereof so as to guide air which has passed around the condenser to dissipate out of the main body. An air guide is securely mounted between the upper lid and the main body. The air guides includes a disc with a central opening, an upper tubular member projecting upwardly from an upper side of the disc and having a first through hole communicating with the central opening of the disc, and a lower tubular member projecting downwardly from an underside of the disc and having a second through hole communicating with the central opening of the disc.

5 Claims, 2 Drawing Sheets

DISTILLER

BACKGROUND OF THE INVENTION

1. Field of the Invention

The present invention relates to a distiller, and more particularly to comprise an air guiding means mounted between an upper lid and a main body.

2. Description of the Related Art

U.S. Pat. No. 4,342,623, issued to Loeffler, discloses a portable water distiller having an insulated container for raw water and a removable cover for the container wall. A condenser coil is provided in the cover along with a motor-driven fan, and inlet and outlet ports are provided about the periphery of the cover to allow cooling air to be drawn into the cover over the condenser and motor. An inlet tube connected to the condenser coil receives steam from the container generated by a heater connected to the container bottom.

U.S. Pat. No. 4,818,344, issued to Glucksman, discloses a portable water distiller comprising a vaporization chamber containing an electric coil heating element, a finned tube condenser coil, and an electric fan motor for cooling the condenser coil's outer surface. In a preferred embodiment, the vaporization chamber includes an upper vertical tube having an open bottom and closed top communication with the condenser, and a raw water receptacle with its rim surrounding the tube at a distance and with its bottom near the bottom end of the tube. The receptacle of the portable water distiller is automatically kept full with water up to a predetermined level, and is readily removable from the distiller for cleaning of residue, the lower portion of the tube is similarly removable for access to the heating element. The condenser coil is designed to offer low flow resistance resulting in only a small over-pressure in the vaporization chamber thus affecting only a small depression of the water level therein.

However, neither Loeffler nor Glucksman discloses an air guiding means mounted between an upper lid and a main body in that cooling air, entering from air inlet, could be guided to an air outlet to flow fluently without reducing the heat dissipating effect. The present invention intends to provide an air guiding means to mitigates and overcome the above problem.

SUMMARY OF THE INVENTION

The primary object of this invention is to provide a distiller comprising an air guiding means that can guide the cooling air entering from an inlet and dissipating to an outlet so as to increase the heat dissipating effect.

In accordance with the present invention, a distiller comprises a main body comprising a main housing inside which water is heated to generate steam, a condenser through which the steam is passed, a fan for supplying cool air to the condenser, a water output defined in the main body, and a plurality of air inlet defined in an outer periphery of the main housing. The condenser extends helically in the main body and includes a plurality of circular fins on an outer periphery thereof.

An upper lid is mounted on top of the main body and includes a plurality of vents defined in an upper side thereof so as to guide hot air which has passed through the condenser to exit the main body. An air guiding means is securely mounted between the upper lid and the main body. The air guiding means includes a disc with a central opening, an upper tubular member projecting upwardly from an upper side of the disc and having a first through hole communicating with the central opening of central opening of the disc, and a lower tubular member projecting downwardly from a underside of the disc and having a second through hole communicating with the central opening of the disc. Each circular fin of the condenser includes an uppermost central point defined in a peripheral edge thereof, and a circle is defined by the uppermost central points of the circular fins of an upper section of the condenser, and the lower tubular member includes the second through hole defined by an annual lower edge thereof, which lies around the circle. Preferably, the lower tubular member and the upper tubular member are bell-shaped or bowl-shaped so as to guide cooling air to flow fluently.

Other objects, advantages and novel features of the invention will become more apparent from the following detailed description when taken in conjunction with the accompanying drawings.

BRIEF DESCRIPTION OF THE DRAWINGS

The present invention will now be described in detail with reference to the accompanying drawings wherein.

DETAILED DESCRIPTION OF THE PREFERRED EMBODIMENT

Figure 1:
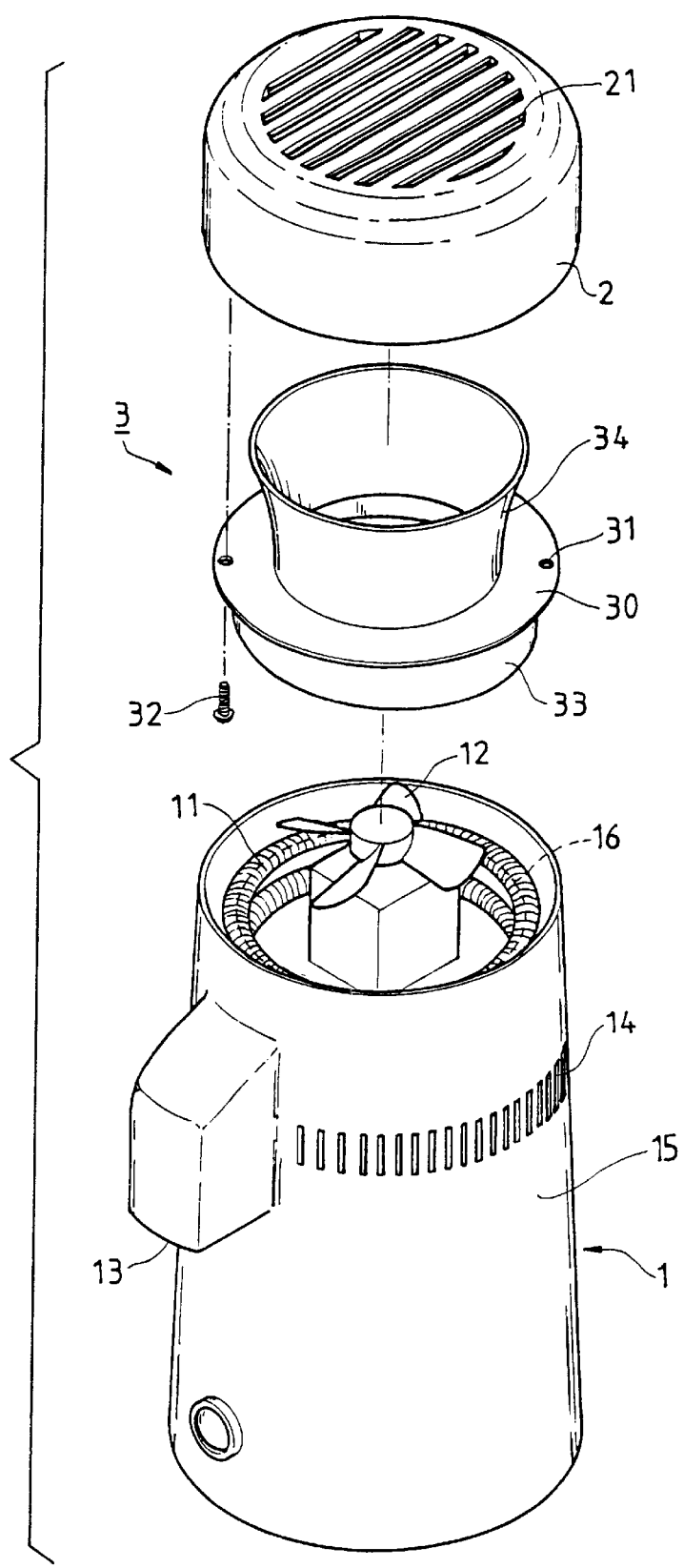
FIG. 1 is an exploded perspective view of a distiller in accordance with the present invention.
Figure 2:
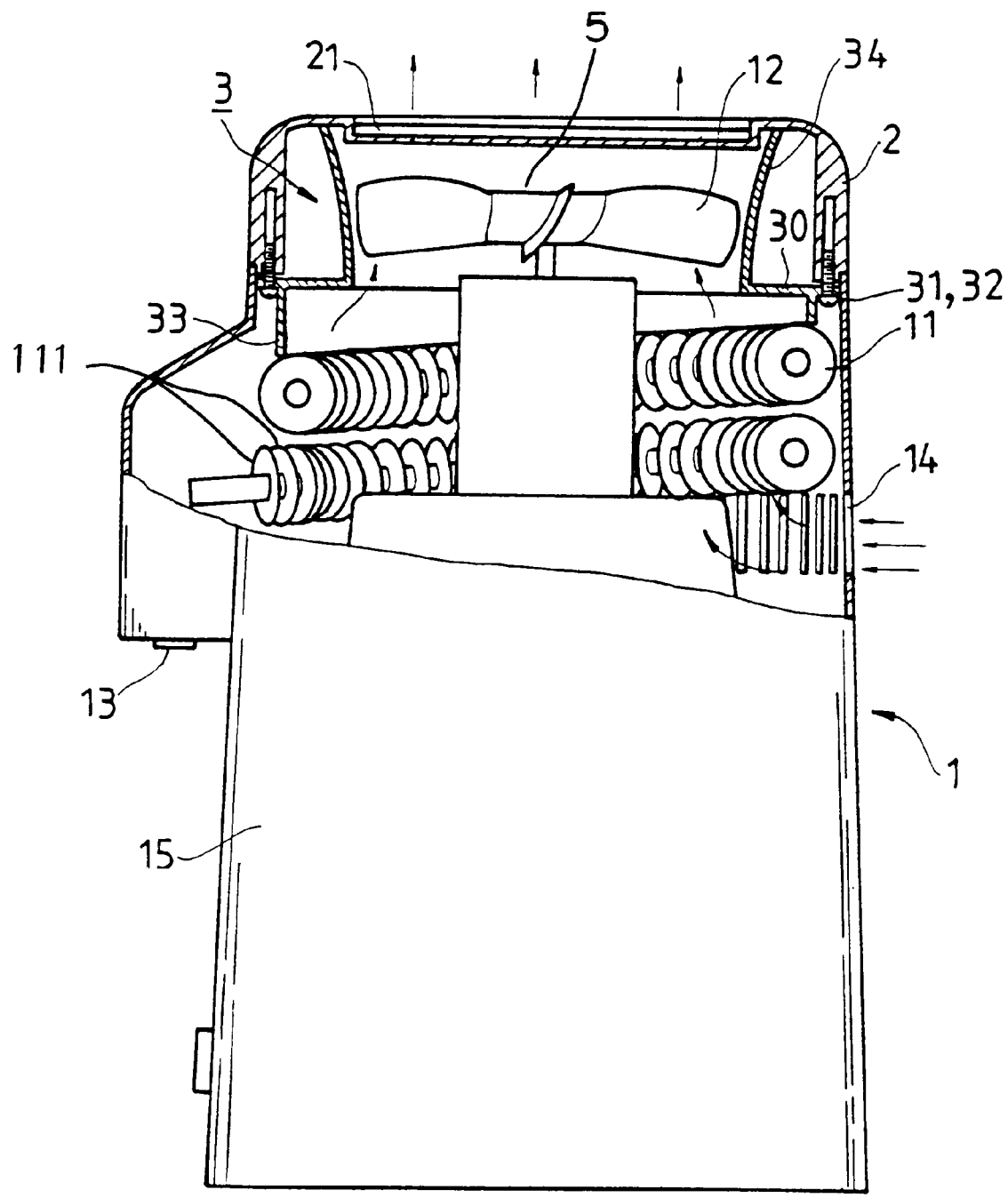
FIG. 2 is a side view, partly sectioned, of the distiller in accordance with the present invention.

Referring to FIG. 1 and 2, a distiller in accordance with the present invention includes a main body 1 comprising a main housing 15 which has a container (not shown) and a heating device (not shown) for heating water inside the container in order to generate steam under the control of a temperature control member (not shown). The steam, is the main housing 15, is passed through a condenser 11 mounted above the main housing 15, and cooled by a fan 12, and then outputted via an outlet 13. Cooling air is sucked in a plurality of air inlets 14 defined in an outer periphery of the main housing during rotation of the fan 12 for proceeding heat exchange in the condenser 11.

An upper lid 2 is mounted on the top of the main body 1 to protect the condenser 11 and the fan 12. A plurality of air outlets 21 are defined in an upper side of the upper lid 2 so as to dissipate heated air exchanged from the condenser 11.

The present invention is characterized by providing an air guide 3 between the upper lid 2 and the main body 1 and the air guide 3 is configured with an appropriate channel 5 to receive the fan 12 so as to improve heat dissipation, as shown in FIG. 2. The air guide 3 can be securely attached to the upper lid 2 by bolts 32 extending through holes 31. In this embodiment, the air guide includes a disc 30 with a central opening (not labeled), an upper tubular member 34 projecting upwardly from an upper side of the disc 30 and having a first through hole communicating with the central opening of the disc 30, and a lower tubular member 33 projecting downwardly from an underside of the disc 30 and having a second through hole communicating with the central opening of the disc 30. The present invention is further characterized in that the diameter of the lower tubular member 33 is larger than that of the upper tubular member 34 so that air traveling from the lower tubular member 33 to the upper tubular member 34 is speeded up, via the nozzle effect, as shown in FIG. 2.

In this embodiment, the condenser 11 extends helically in the main body 1. The condenser 11 includes a plurality of circular cooling fins 111 each of which has an uppermost central point defined in a peripheral edge thereof, and a ring or circle 16 is defined by the uppermost central points of the circular fins of an upper section of the condenser 11. The lower tubular member 33 includes the second through hole defined by an annular lower edge thereof, which lies around the circle 16. The upper tubular member 34 extends upwardly to contact an underside of an upper wall in which the air outlets 21 are defined. Preferably, the lower tubular member 33 and the upper tubular member 34 are bell-shaped or bowl-shaped so as to guide cooling air to flow fluently.

During operation, when the fan 12 rotates, cooling air is sucked in through the air inlets 14 and passes through the condenser 11, and is guided into the air guide 3, and is eventually dissipated out via the air outlets 21. The condenser 11 is cooled by air entering the air inlets 14 and exiting via the outlets 21 while steam is passing through the condenser 11. A large amount of cooling air can be circulated around the condenser 11 as air enters air inlets 14 and is dissipated to the air outlets 21 through the air guide 3, thereby allowing rapid heat exchange in the condenser 11, such that the water condensation efficiency is improved, the water output temperature is lowered, and water can be outputted more quickly.

A conventional distiller heats water, without an air guiding means, by means of a heating device so as to generate steam which, in turn, becomes distilled water after passing through a condenser. It has been found that if the input power is 500 watts, the output water temperature is in a range of 40° C.~50° C., the water recovery is about 97%~98%, and the water output rate is 0.65~0.7 kg/hr. If the input power is 600 watts, the output water temperature is in a range of 60° C.~70° C., the water recovery rate is below 90%, and the water output rate is 0.7~0.75 kg/hr. And if the input power is over 800 watts, the output water temperature is over 100° C., the water recovery rate is almost 0% (i.e., all of the steam could not be condensed but passes through the condenser), and the water output rate is almost 0 kg/hr. It is appreciated that when the input power is less than 500 watts, a better water recovery rate and a lower output water temperature can be obtained. When the input power is more than 600 watts, the water output temperature increases apparently and the water recovery rate decreases. When the input power is more than 700 watts, the active carbon almost loses its filtering function. And when the input power is over 800 watts, the output water temperature is over 100° C., and all of the steam could not be condensed but passed through the condenser result in that the water recovery rate is almost 0%. The present invention comprises an air guiding means, in that cooling air is tucked in the air inlets, then passed through the condenser by the fan, and is then rapidly driven and guided into the air guiding means as to increase heat dissipating effect. After that new cooling air will be sucked while the heated cooling air is dissipated out via the air outlet.

Although the invention has been described in detail with reference to the preferred embodiment, it will be understood by one of ordinary skills in the art that various modifications can be made without departing from the spirit and scope of the invention, as set forth in the appended claims.

What is claimed is:

1. A distiller comprising:
    a main body comprising a main housing inside which water is heated to generate steam;
    a condenser through which the steam is passed therethrough, the condenser comprising a condenser tube, the condenser extending helically in the main body and comprising plurality of circular cooling fins on an outer periphery thereof;
    a water output defined in the main body and connected to the condenser;
    a plurality of air inlets defined in an outer periphery of the main housing;
    an upper lid mounted on top of the main body, the upper lid comprising a plurality of air outlets positioned in an upper side thereof and arranged to guide air which circulated around the condenser to exit the main body;
    an air guide securely mounted between the upper lid and the main body, the air guide comprising a channel formed by upper and lower tubular members, the tubular members each comprising inlets having inlet diameters, the inlet diameter of the lower tubular member is greater than that of the upper tubular member;
    a fan housed in the channel of the air guide and arranged to supply ambient air to cool the condenser;
    wherein ambient air is pulled into the air inlets and through the air guide, circulated over the condenser and dissipated out of the distiller through the air outlets by the fan; and
    wherein the air guide comprises a disc with a central opening, the upper tubular member projecting upwardly from an upper side of the disc and having a first through hole communicating with the central opening of the disc, and the lower tubular member projecting downwardly from an underside of the disc and having a second through hole communicating with the central opening of the disc, each of the cooling fins of the condenser comprising an uppermost central point defined in a peripheral edge thereof, and a circle being defined by the uppermost central points of the cooling fins of an upper section of the condenser.

2. The distiller claimed in claim 1, wherein the lower tubular member and the upper tubular member are substantially bell-shaped.

3. The distiller as claimed in claim 1, wherein the lower tubular member and the upper tubular member are substantially bowl-shaped.

4. The distiller as claimed in claim 1, wherein the speed of air exiting out of the upper tubular member exceeds that of the air entering the lower tubular member.

5. The distiller as claimed in claim 1, wherein the inlet diameters of the lower and upper tubular members of the air guide is coaxial with the fan.

\* \* \* \* \*